United States Patent
Meier et al.

(10) Patent No.: US 6,949,631 B2
(45) Date of Patent: Sep. 27, 2005

(54) REACTIVE AZO DYES, METHOD FOR THE PRODUCTION AND USE THEREOF

(75) Inventors: Stefan Meier, Frankfurt am Main (DE); Werner Russ, Flörsheim-Wicker (DE); Jörg Wörner, Bruchköbel (DE)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 0 days.

(21) Appl. No.: 10/494,008

(22) PCT Filed: Nov. 28, 2002

(86) PCT No.: PCT/EP02/13410

§ 371 (c)(1),
(2), (4) Date: Apr. 29, 2004

(87) PCT Pub. No.: WO03/046087

PCT Pub. Date: Jun. 5, 2003

(65) Prior Publication Data

US 2004/0260074 A1 Dec. 23, 2004

(30) Foreign Application Priority Data

Nov. 30, 2001 (DE) .......................... 101 59 001

(51) Int. Cl.⁷ ...................... C09B 62/085; C09B 62/51; D06P 1/38
(52) U.S. Cl. ......................... 534/638; 534/642; 8/549
(58) Field of Search ................ 534/638, 642; 8/549

(56) References Cited

U.S. PATENT DOCUMENTS

| | | | | |
|---|---|---|---|---|
| 5,023,326 A | * | 6/1991 | Tzikas et al. .............. | 534/638 |
| 5,760,194 A | * | 6/1998 | Lehmann et al. ........... | 534/636 |
| 5,760,195 A | * | 6/1998 | Lehmann et al. ........... | 534/638 |
| 5,789,557 A | * | 8/1998 | Dornhagen et al. ......... | 534/634 |
| 6,410,698 B1 | * | 6/2002 | Prechtl et al. .............. | 534/638 |
| 2001/0013149 A1 | | 8/2001 | Scheibli et al. | |

FOREIGN PATENT DOCUMENTS

| | | |
|---|---|---|
| DE | 19810906 | 9/1999 |
| EP | 0922735 | 6/1999 |
| WO | WO-96/10610 | 4/1996 |
| WO | WO-02/16504 | 2/2002 |

* cited by examiner

Primary Examiner—Fiona T. Powers
(74) Attorney, Agent, or Firm—Connolly Bove Lodge & Hutz

(57) ABSTRACT

The present invention relates to reactive dyes of the general formula (1)

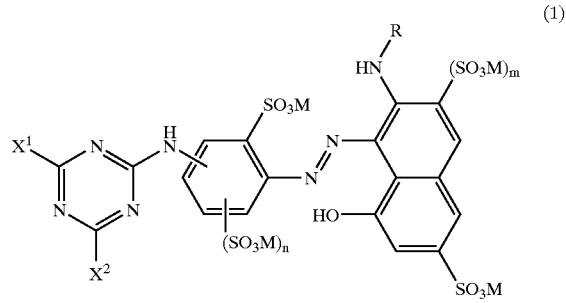

(1)

where $X^1$, $X^2$, R, M, m and n are each as defined in claim 1, processes for their preparation and also their use for dyeing and printing hydroxyl- and/or carboxamido-containing materials.

8 Claims, No Drawings

REACTIVE AZO DYES, METHOD FOR THE PRODUCTION AND USE THEREOF

RELATED APPLICATIONS

This application is a 371 application of PCT/EP02/13410 filed on Nov. 28, 2002 and claims benefit to German application no. 101 59 001.6 filed Nov. 30, 2001.

The present invention relates to the field of fiber-reactive dyes.

DE-A-4434989, DE 19600765, DE 19810906 and EP-A 922735 disclose dyes which are structurally similar to the hereinbelow described dyes of the present invention, but which differ with regard to the reactive group or in the type of coupling component. These known dyes have a number of technical disadvantages in the dyeing of textile materials.

It is an object of the present invention to ameliorate these technical disadvantages.

It has now been found that, surprisingly, the hereinbelow described dyes of the general formula (1) are advantageous over the known dyes:

The present invention accordingly provides reactive dyes of the general formula (1)

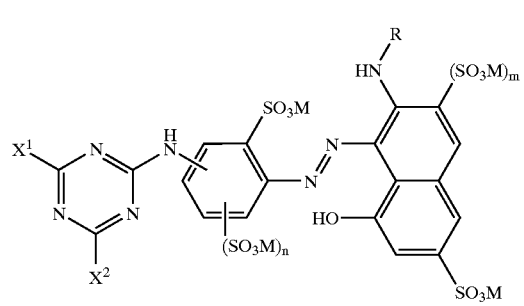

(1)

where

R is hydrogen, alkyl or substituted alkyl $X^1$ is halogen, amino, optionally substituted amino or $X^2$, $X^2$ is a substituent of the general formula (2)

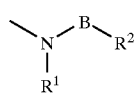

(2)

where $R^1$ is substituted or unsubstituted aryl,

B is alkylene which may be interrupted by an oxygen atom, and $R^2$ is a $-SO_2CH=CH_2$ or $-SO_2CH_2CH_2Z$ radical, where Z is a moiety which can be eliminated by the action of alkali, n and m are each 0 or 1, and M is hydrogen, ammonium, an alkali metal or the equivalent of an alkaline earth metal.

In the general formula (1), an alkali metal M can be in particular lithium, sodium and potassium, whereas the alkaline earth metal is calcium in particular. Preferably, M is hydrogen or sodium.

Halogen $X^1$ is in particular fluorine or chlorine, and substituted amino denotes in particular amino which is substituted by an aryl radical bearing one or more fiber-reactive radicals $-SO_2CH=CH_2$ or $-SO_2CH_2CH_2Z'$, where Z' represents a moiety which can be eliminated by the action of alkali. Preferably, amino is substituted by m-sulfatoethylsulfonylphenyl or p-sulfatoethylsulfonylphenyl.

Alkyl R is preferably $(C_1-C_8)$-alkyl and particularly preferably $(C_1-C_4)$-alkyl. Examples of alkyl groups of this type are methyl, ethyl, n-propyl, i-propyl, n-butyl, i-butyl, sec-butyl and tert-butyl. Alkyl R can be substituted by an $SO_3H$ group for example.

Aryl $R^1$ is in particular phenyl which can be mono- or polysubstituted by for example $(C_1-C_4)$-alkyl, $(C_1-C_4)$-alkoxy, chlorine, fluorine or $SO_3H$. Preferably, $R^1$ is phenyl or an aryl radical which bears a sulfo group.

Alkylene B is preferably $(C_1-C_8)$-alkylene and particularly preferably $(C_1-C_4)$-alkylene. Examples of alkylene groups of this type are methylene, ethylene, n-propylene, i-propylene and butylene. Alkylene interrupted by an oxygen atom is preferably $-(CH_2)_2-O-(CH_2)_2-$.

Examples of Z radicals which can be eliminated by the action of alkali, ie under dyeing conditions, are chlorine, bromine, sulfato, thiosulfato, phosphate, $(C_2-C_5)$-alkanoyloxy such as for example acetyloxy, benzoyloxy, sulfobenzoyloxy or p-toluylsulfonyloxy, of which sulfato is preferred.

The groups "sulfato", "thiosulfato" and "phosphate" include not only their acid form but also their salt form. Accordingly, thiosulfato groups conform to the general formula $-S-SO_3M$, phosphato groups conform to the general formula $-OPO_3M_2$ and sulfato groups conform to the general formula $-OSO_3M$, in each of which M is as defined above.

Preferred reactive dyes of the present invention are those of the general formula (1) where the radical of the general formula (2) corresponds to one of the radicals (2-1) to (2-4)

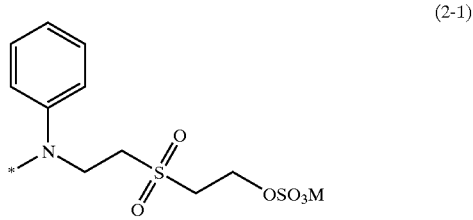

(2-1)

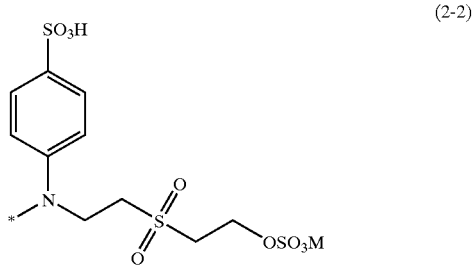

(2-2)

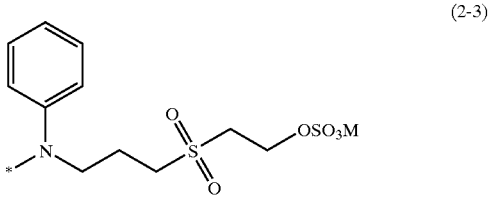

(2-3)

-continued

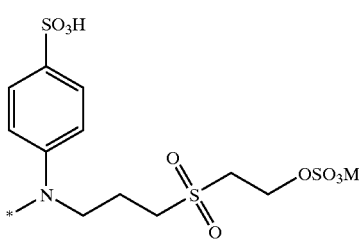

(2-4)

where M is as defined above.

Particular preference is given to the dyes of the formulae (1a) to (1c) according to the invention

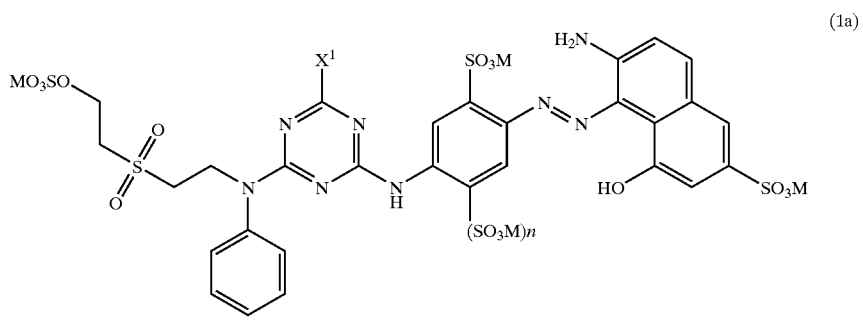

(1a)

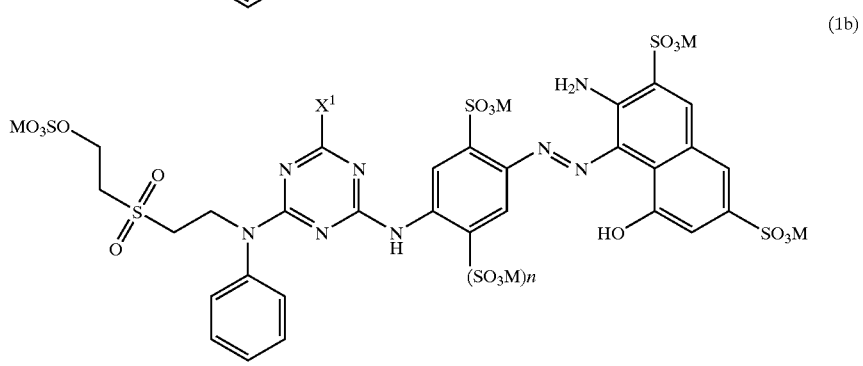

(1b)

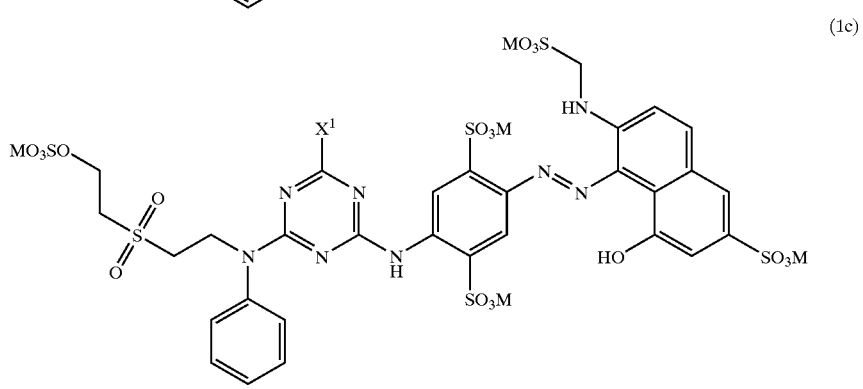

(1c)

where M, n and $X^1$ are each as defined above.

The reactive dyes of the general formula (1) according to the invention are generally present as a preparation in solid or liquid (dissolved) form. In solid form, they generally contain the electrolyte salts customary in the case of water-soluble and especially fiber-reactive dyes, such as sodium chloride, potassium chloride and sodium sulfate, and can further contain the auxiliaries customary in commercial dyes, such as buffer substances capable of setting a pH in aqueous solution between 3 and 7, such as sodium acetate, sodium borate, sodium bicarbonate, sodium dihydrogenphosphate, sodium tricitrate and disodium hydrogenphosphate, or small amounts of siccatives or, if they are present in a liquid, aqueous solution (including the presence of thickeners of the type customary in print pastes), they may also include substances which ensure a long life for these preparations, for example mold preventatives.

The reactive dyes of the general formula (1) according to the invention are preferably present as a dye powder or as a granular dye containing 10 to 80% by weight, based on the powder or granules, of an electrolyte salt which is also known as a standardizing agent. Granules in particular have particle sizes of 50 to 500 μm. These solid preparations can further contain the aforementioned buffer substances in a total amount of up to 10% by weight, based on the preparation. When the dyes are present in aqueous solution, the total dye content in these aqueous solutions will be up to about 50% by weight, for example between 5 and 50% by weight, and the electrolyte salt content in these aqueous solutions will preferably be below 10% by weight, based on the aqueous solution. The aqueous solutions (liquid preparations) can contain the aforementioned buffer substances generally in an amount of up to 10% by weight, preferably up to 2% by weight.

Reactive dyes of the general formula (1) according to the invention may have the same chromophor but differ with regard to the fiber-reactive group $R^2$. More particularly, in the case of the same chromophor, $R^2$ can be firstly —$SO_2CH$=$CH_2$ and secondly —$SO_2CH_2CH_2Z$, particularly preferably β-sulfatoethylsulfonyl. The fraction of dye in the vinylsulfonyl form can be up to about 30 mol %, based on the respective dye chromophor. Preferably, the fraction of vinylsulfonyl dye to β-ethyl-substituted dye is in a molar ratio between 5:95 and 30:70.

The present invention further provides processes for preparing the reactive dyes of the general formula (1).

These are obtainable for example when a compound of the general formula (3)

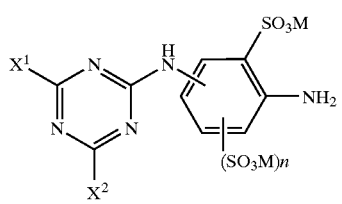

(3)

where $X^1$, $X^2$, M and n are each as defined above, is diazotized and reacted with a compound of the formula (4)

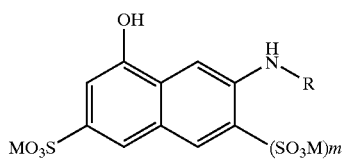

(4)

Alternatively, a compound of the general formula (5)

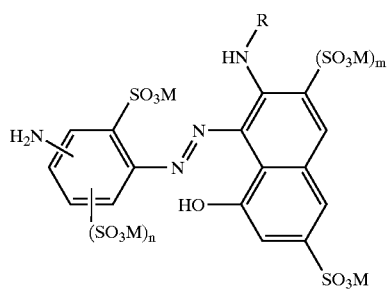

(5)

where R, M, m and n are each as defined above, can be condensed with a halotriazine of the general formula (6)

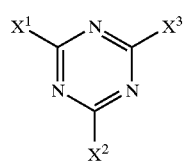

(6)

where $X^1$ and $X^2$ are each as defined above and $X^3$ is fluorine or chlorine.

The compound of the general formula (6) can in turn be obtained from trifluorotriazine or trichlorotriazine and one or two compounds of the general formula (2')

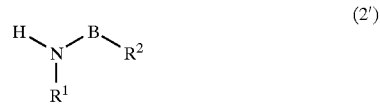

(2')

The compounds of the general formula (1), in which $X^2$ is a radical of the general formula (2), are alternatively also preparable by reaction of a compound of the general formula (5) with trihalotriazine and subsequent condensation with an amine of the general formula (2').

Dyes of the general formula (1) where $X^1$ is $X^2$ and is not halogen are obtained by condensation of dyes of the general formula (1) where $X^1$ is halogen by reaction with a reactive amine of the general formula (2') in aqueous solution.

The compounds of the general formula (3) are obtainable in various ways. When $X^2$ is a radical of the formula (2), the condensation products are obtained by reaction of halotriazines (6) with diaminobenzenesulfonic acids or diaminobenzenedisulfonic acids, preferably 1,3-diaminobenzene-4-sulfonic acid, 1,4-diaminobenzene-2-sulfonic acid and also 1,4-diaminobenzene-2,5-disulfonic acid and 2,4-diaminobenzene-1,5-disulfonic acid, or by condensation of a trichloro- or trifluorotriazine with diaminobenzenesulfonic acids or diaminobenzenedisulfonic acids and subsequent condensation with an amine of the general formula (2').

The abovementioned diazotization, coupling and condensation reactions are known per se to one skilled in the art and can be carried out in the generally customary manner extensively described in the field's literature.

The dyes of the general formula (1) according to the invention are obtained as a solution or suspension in the above-described methods of making and can be isolated by salting out. They can also be spray dried; another possibility is to evaporate the solution or suspension.

The reactive dyes of the general formula (1) according to the invention possess useful application properties. They are used for dyeing and printing hydroxyl- and/or carboxamido-containing materials, for example in the form of sheetlike structures, such as paper and leather, or of films, of polyamide for example, or in bulk, as for example polyamide and polyurethane, but especially in the form of fibers of the materials mentioned. Preferably, they are used for dyeing and printing cellulosic fiber materials of any kind. They are also useful for dyeing and printing hydroxyl-containing fibers present in blend fabrics, for example blends of cotton with polyester fibers or polyamide fibers. It is also possible to use them to print textiles or paper by the inkjet process.

The present invention accordingly also provides for the use of the reactive dyes of the general formula (1) according to the invention for dyeing and printing the materials mentioned or, to be more precise, processes for dyeing or printing such materials in a conventional manner by using one or more reactive dyes of the general formula (1) according to the invention as a colorant.

Advantageously, the as-synthesized solutions of the reactive dyes of the general formula (1) according to the invention can be used directly as a liquid preparation for dyeing, if appropriate after addition of a buffer substance and similarly if appropriate after concentrating or diluting.

The materials mentioned are preferably used in the form of fiber materials, especially in the form of textile fibers, such as wovens or yarns, as in the form of hanks or wound packages.

Hydroxyl-containing materials are those of natural or synthetic origin, for example cellulose fiber materials or regenerated products thereof and polyvinyl alcohols. Cellulose fiber materials are preferably cotton, but also other vegetable fibers, such as linen, hemp, jute and ramie fibers. Regenerated cellulose fibers are for example staple viscose and filament viscose.

Carboxamido-containing materials are for example synthetic and natural polyamides and polyurethanes, especially in the form of fibers, for example wool and other animal hairs, silk, leather, nylon-6,6, nylon-6, nylon-11 and nylon-4.

The reactive dyes of the general formula (1) according to the invention can be applied to and fixed on the substrates mentioned, especially the fiber materials mentioned, by the application techniques known for water-soluble dyes and especially by the application techniques known for fiber-reactive dyes. Applied in this way by exhaust dyeing processes to cellulose fibers from a long liquor using a variety of acid-binding agents with or without neutral salts, such as sodium chloride or sodium sulfate, they produce dyeings having very good color yields. They are preferably applied in an aqueous bath at temperatures between 40 and 105° C., if appropriate at a temperature of up to 130° C. under pressure, and if appropriate in the presence of customary dyeing assistants. One possible procedure in this context is to introduce the material into the warm bath and to gradually heat the bath to the desired dyeing temperature and to complete the dyeing operation at that temperature. The neutral salts which speed the exhaustion of the dyes may also, if appropriate, not be added to the bath until the actual dyeing temperature has been reached.

The padding process likewise provides excellent color yields and very good color build-up on cellulose fibers, the dyes being fixable in a conventional manner by batching at room temperature or elevated temperature, for example at up to about 60° C., by steaming or using dry heat.

Similarly, the customary printing processes for cellulose fibers, which can be carried out either single-phase, for example by printing with a print paste comprising sodium bicarbonate or some other acid-binding agent and by subsequent steaming at 100 to 103° C., or two-phase, for example by printing with a neutral or weakly acidic print color and subsequent fixation either by passing the printed material through a hot electrolyte-containing alkaline bath or by overpadding with an alkaline electrolyte-containing padding liquor with subsequent batching or steaming or dry heat treatment of the alkali-overpadded material, produce strong prints having well-defined contours and a clear white ground. The outcome of the prints is substantially unaffected by variations in the fixing conditions.

When fixing by means of dry heat in accordance with the customary thermofix processes, hot air from 120 to 200° C. is used. In addition to the customary steam at 101 to 103° C., it is also possible to use superheated steam and high-pressure steam at temperatures of up to 160° C.

The acid-binding agents which effect the fixation of the dyes on the cellulose fibers include for example water-soluble basic salts of the alkali metals and likewise alkaline earth metals of inorganic or organic acids or compounds which release alkali in the heat. Especially suitable are the alkali metal hydroxides and alkali metal salts of weak to medium inorganic or organic acids, the preferred alkali metal compounds being the sodium and potassium compounds. Such acid-binding agents include for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, sodium silicate or trisodium phosphate.

The reactive dyes of the general formula (1) according to the invention are notable for high reactivity, good fixability, very good build-up and also high light and perspiration-light fastness. They can therefore be used by the exhaust dyeing process at low dyeing temperatures and require only short steaming times in pad-steam processes. The degrees of fixation are high, and the unfixed portions are readily washed off, the difference between the degree of exhaustion and the degree of fixation being remarkably small, ie the hydrolysis loss being very small. They are also particularly useful for printing, especially on cotton, but also for printing nitrogenous fibers, for example wool or silk or blend fabrics containing wool or silk.

The reactive dyes of the general formula (1) according to the invention are further notable for the fact that, following the dyeing operation, unfixed dye portions are very readily washed off the fiber material without adjacent whites in the washing operation being tainted by the dye which becomes detached. This is advantageous for the dye operation in that washing cycles and hence costs are saved.

The dyeings and prints prepared with the reactive dyes of the general formula (1) according to the invention, especially on cellulose fiber materials, possess high color strength and high fiber-dye bond stability not only in the acidic but also in the alkaline range as well as good lightfastness and very good wetfastness properties, such as washing, water, seawater, crossdyeing and perspiration fastnesses, and also good fastness to dry heat setting and pleating and to crocking.

The examples hereinbelow serve to illustrate the invention. The parts and percentages are by weight, unless otherwise stated. Parts by weight relate to parts by volume as the kilogram relates to the liter.

The compounds described in the examples in terms of formulae are indicated in the form of the free acid. But generally they are prepared and isolated in the form of the alkali metal salts, such as lithium, sodium or potassium salts, and used for dyeing in the form of their salts. Similarly, the starting compounds and components indicated in the form of the free acid in the subsequent examples, especially table examples, can be used in the synthesis as such or in the form of their salts, preferably alkali metal salts.

The absorption maxima ($\lambda_{max}$) in the visible range reported for the dyes according to the invention were determined on aqueous solutions of their alkali metal salts.

EXAMPLE 1

18.4 parts of 2,4,6-trichloro-1,3,5-triazine are suspended in 200 parts of ice-water at 0–5° C. in the course of 30 minutes. 30.9 parts of 2-(anilino)ethyl 2-sulfatoethyl sulfone are then added over 30 minutes while the reaction solution is maintained at pH 2.5 by concurrent metered addition of 15% sodium carbonate solution. The reaction mixture is subsequently stirred at 0–5° C., then mixed with 26.8 parts of 1,4-diaminobenzene-2,5-disulfonic acid and adjusted to pH 5.5 with 15% sodium carbonate solution. The reaction mixture is subsequently warmed to 35° C. and subsequently stirred for 30 minutes. It is cooled to 10° C., admixed with 6.9 parts of sodium nitrite and added dropwise to an initial charge of 100 parts of ice and 40 parts of conc. hydrochloric acid (31%). After stirring for 1 hour, excess nitrite is removed by addition of sulfamic acid.

23.9 parts of 7-amino-1-hydroxynaphthalene-3-sulfonic acid are dissolved in 300 parts of water and neutralized by addition of aqueous sodium hydroxide solution. The neutral solution is added dropwise to the cold diazotization batch at 10° C. over 30 minutes. The resulting pH is 1.5–2.0. The pH is adjusted to 2.5 with 15% sodium carbonate solution over 30 minutes and the solution is subsequently stirred at rising temperature for 3 hours. It is then adjusted to pH 6 with sodium carbonate solution and buffered with $NaH_2PO_4$/$Na_2HPO_4$. The solution obtained is evaporated.

The dye obtained has the formula

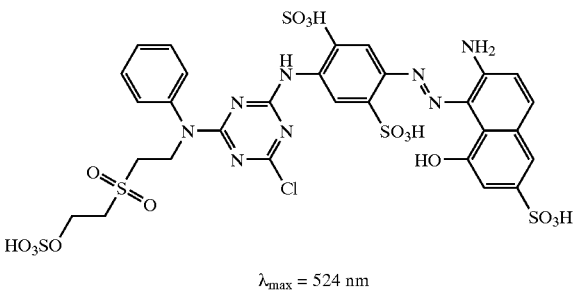

$\lambda_{max}$ = 524 nm

It dyes and prints cotton in bluish red shades having good fastnesses, especially high lightfastness.

The dyes of examples (2) to (32) were obtained in a similar manner. To this end, the corresponding reactive amine was reacted with trichlorotriazine and subsequently reacted with the condensation component, diazotized and coupled onto the coupling component.

| Ex. | Reactive amine | Condensation component | Coupling component | Hue | λmax |
|---|---|---|---|---|---|
| 2) | 2-(anilino)ethyl 2-sulfatoethyl sulfone | 1,4-diaminobenzene-2,5-disulfonic acid | 7-amino-1-hydroxy-naphthalene-3,6-disulfonic | red | 528 |
| 3) | " | " | 7-sulfomethylamino-1-hydroxynaphthalene-3-sulfonic acid | red | 536 |
| 4) | " | 2,4-diaminobenzene-1,5-disulfonic acid | 7-amino-1-hydroxy-naphthalene-3-sulfonic acid | red | 519 |
| 5) | " | " | 7-amino-1-hydroxy-naphthalene-3,6-disulfonic acid | red | 521 |
| 6) | " | " | 7-sulfomethylamino-1-hydroxynaphthalene-3-sulfonic acid | red | 532 |
| 7) | " | 1,4-diaminobenzene-2-sulfonic acid | 7-amino-1-hydroxy-naphthalene-3-sulfonic acid | red | 517 |
| 8) | " | " | 7-amino-1-hydroxy-naphthalene-3,6-disulfonic acid | red | 524 |
| 9) | " | 1,3-diaminobenzene-4-sulfonic acid | 7-amino-1-hydroxy-naphthalene-3-sulfonic acid | red | 510 |
| 10) | " | " | 7-amino-1-hydroxy-naphthalene-3,6-disulfonic acid | red | 514 |
| 11) | 3-(anilino)propyl 2-sulfatoethyl sulfone | 1,4-diaminobenzene-2,5-disulfonic acid | 7-amino-1-hydroxy-naphthalene-3-sulfonic acid | red | 524 |
| 12) | " | " | 7-amino-1-hydroxy-naphthalene-3,6-disulfonic acid | red | 527 |
| 13) | " | " | 7-sulfomethylamino-1-hydroxynaphthalene-3-sulfonic acid | red | 537 |
| 14) | " | 2,4-diaminobenzene-1,5-disulfonic acid | 7-amino-1-hydroxy-naphthalene-3-sulfonic acid | red | 519 |
| 15) | " | " | 7-amino-1-hydroxy-naphthalene-3,6-disulfonic acid | red | 521 |
| 16) | " | " | 7-sulfomethylamino-1-hydroxynaphthalene-3-sulfonic acid | red | 532 |
| 17) | " | 1,4-diaminobenzene-2-sulfonic acid | 7-amino-1-hydroxy-naphthalene-3-sulfonic acid | red | 518 |
| 18) | " | " | 7-amino-1-hydroxy-naphthalene-3,6-disulfonic acid | red | 524 |

-continued

| Ex. | Reactive amine | Condensation component | Coupling component | Hue | λmax |
|---|---|---|---|---|---|
| 19) | " | 1,3-diaminobenzene-4-sulfonic acid | 7-amino-1-hydroxy-naphthalene-3-sulfonic acid | red | 510 |
| 20) | " | " | 7-amino-1-hydroxy-naphthalene-3,6-disulfonic acid | red | 514 |
| 21) | 2-(4-sulfophenyl-amino)ethyl 2-sulfatoethyl sulfone | 1,4-diaminobenzene-2,5-disulfonic acid | 7-amino-1-hydroxy-naphthalene-3-sulfonic acid | red | 523 |
| 22) | " | " | 7-amino-1-hydroxy-naphthalene-3,6-disulfonic acid | red | 528 |
| 23) | " | " | 7-sulfomethylamino-1-hydroxynaphthalene-3-sulfonic acid | red | 537 |
| 24) | " | 2,4-diaminobenzene-1,5-disulfonic acid | 7-amino-1-hydroxy-naphthalene-3-sulfonic acid | red | 518 |
| 25) | " | " | 7-amino-1-hydroxy-naphthalene-3,6-disulfonic acid | red | 522 |
| 26) | " | " | 7-sulfomethylamino-1-hydroxynaphthalene-3-sulfonic acid | red | 531 |
| 27) | " | 1,4-diaminobenzene-2-sulfonic acid | 7-amino-1-hydroxy-naphthalene-3-sulfonic acid | red | 517 |
| 28) | " | 1,4-diaminobenzene-2-sulfonic acid | 7-amino-1-hydroxy-naphthalene-3,6-disulfonic acid | red | 525 |
| 29) | " | 1,3-diaminobenzene-4-sulfonic acid | 7-amino-1-hydroxy-naphthalene-3-sulfonic acid | red | 511 |
| 30) | " | " | 7-amino-1-hydroxy-naphthalene-3,6-disulfonic acid | red | 515 |
| 31) | 3-(4-sulfophenyl-amino)propyl 2-sulfatoethyl sulfone | 1,4-diaminobenzene-2,5-disulfonic acid | 7-amino-1-hydroxy-naphthalene-3-sulfonic acid | red | 524 |
| 32) | " | " | 7-amino-1-hydroxy-naphthalene-3,6-disulfonic acid | red | 528 |
| 33) | " | " | 7-sulfomethylamino-1-hydroxy-naphthalene-3-sulfonic acid | red | 537 |
| 34) | " | 2,4-diaminobenzene-1,5-disulfonic acid | 7-amino-1-hydroxy-naphthalene-3-sulfonic acid | red | 519 |
| 35) | " | " | 7-amino-1-hydroxy-naphthalene-3,6-disulfonic acid | red | 522 |
| 36) | " | " | 7-sulfomethylamino-1-hydroxynaphthalene-3-sulfonic acid | red | 532 |
| 37) | " | 1,4-diaminobenzene-2-sulfonic acid | 7-amino-1-hydroxy-naphthalene-3-sulfonic acid | red | 518 |
| 38) | " | " | 7-amino-1-hydroxy-naphthalene-3,6-disulfonic acid | red | 523 |
| 39) | " | 1,3-diaminobenzene-4-sulfonic acid | 7-amino-1-hydroxy-naphthalene-3-sulfonic acid | red | 510 |
| 40) | " | " | 7-amino-1-hydroxy-naphthalene-3,6-disulfonic acid | red | 515 |

EXAMPLE 41

21.8 parts of 4-nitroaniline-2-sulfonic acid are suspended in 400 parts of water and neutralized with aqueous sodium hydroxide solution. 6.9 parts of sodium nitrite are added, and the suspension is stirred until everything has dissolved.

The solution is added dropwise at 0–5° C. to initially charged 100 parts of ice and 30 parts of conc. hydrochloric acid (31%) followed by stirring for 60 minutes. Excess nitrite is removed by addition of sulfamic acid.

31.9 parts of 7-amino-1-hydroxynaphthalene-3,6-disulfonic acid are dissolved in 300 parts of water and neutralized with aqueous sodium hydroxide solution and added dropwise to the suspension of the diazonium salt over 30 minutes. The reaction mixture is gradually adjusted to pH 2 with sodium carbonate solution and subsequently stirred for 1 hour. This affords a dye solution which in the form of the free acid contains a compound of the formula (7)

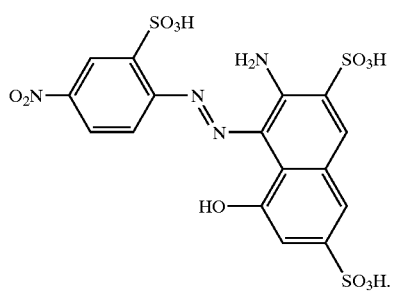

(7)

The solution of the compound (7) is adjusted to pH 8.5 with aqueous sodium hydroxide solution and heated to 70° C. A solution of 5.6 parts of NaHS in 50 parts of water is added dropwise and stirred in for 30 minutes.

The compound obtained is precipitated by addition of 150 parts of sodium chloride, filtered off and washed with aqueous sodium chloride solution. The compound obtained conforms in the form of its free acid to the formula (8)

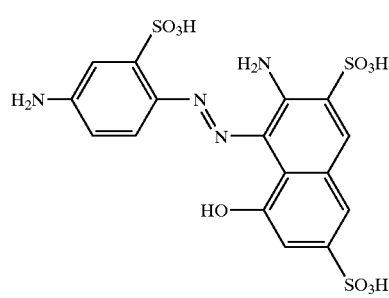

(8)

51.9 parts of compound (8) are dissolved in 500 parts of water. 18.4 parts of 2,4,6-trichloro-1,3,5-triazine are suspended in 200 parts of ice-water at 0–5° C. in the course of 30 minutes. 30.9 parts of 2-(anilino)ethyl 2-sulfatoethyl sulfone are then added over 30 minutes while the reaction solution is maintained at pH 2.5 by concurrent metered addition of 15% sodium carbonate solution. The reaction mixture is subsequently stirred at 0–5° C. for 1 hour, and the suspension obtained is added to the solution of compound (8). The reaction mixture is adjusted to pH 6 with sodium carbonate solution and warmed to 35° C. It is subsequently stirred for 1 hour. The end point of the reaction is determined by thin layer chromatography. The dye of example 6 is precipitated by addition of potassium chloride, filtered off and dried.

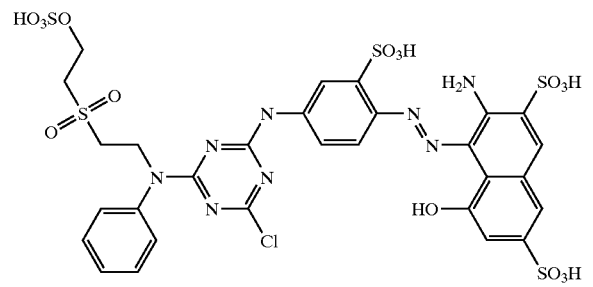

$\lambda_{max} = 524$ nm

The dye dyes cotton in a bluish red shade.

The compounds of examples 5), 13) and 14) are preparable in a similar manner by condensing compound (8) with appropriate triazine derivatives.

By varying the coupling component in compound (8), it is possible to prepare compounds of the general formula (5) by the above-described method. These compounds can be converted into dyes of the general formula (1) by reaction with appropriate triazine derivatives.

Example 42

51.9 parts of compound (12) are dissolved in 500 parts of water, admixed with 4.2 parts of sodium fluoride and cooled to 5° C. 13.5 parts of 2,4,6-trifluorotriazine are then added. The pH initially decreases before it adjusts to about 4-4.5. The reaction solution is subsequently stirred for 15 minutes.

The reaction solution is then admixed with a neutral aqueous solution of 40.3 parts of 3-(4-sulfophenylamino) propyl 2-sulfatoethyl sulfone added dropwise, allowed to warm to 25° C. and all the while maintained at a pH of 6-6.5 kept constant by addition of sodium carbonate solution.

The end point of the reaction is determined by thin layer chromatography.

The solution is evaporated to leave a dye of the formula in the form of the free acid (9)

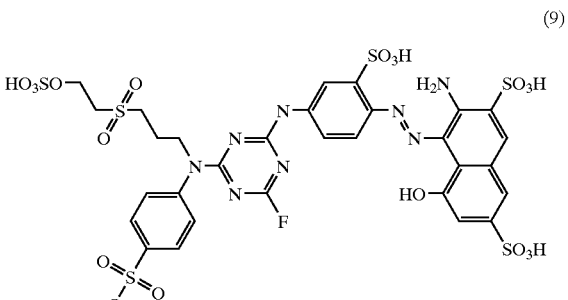

(9)

The dye dyes cotton in a bluish red shade.

The compounds of examples 43) to 49) are preparable in a similar manner by the process described above.

| Ex. | Reactive amine | Coupling component in compound of formula (12) | Hue | λmax |
|---|---|---|---|---|
| 43) | 3-(4-sulfophenylamino)propyl 2-sulfatoethyl sulfone | 7-amino-1-hydroxynaphthalene-3-sulfonic acid | red | 518 |
| 44) | 2-(4-sulfophenylamino)ethyl 2-sulfatoethyl sulfone | 7-amino-1-hydroxynaphthalene-3,6-disulfonic acid | red | 525 |
| 45) | " | 7-amino-1-hydroxynaphthalene-3-sulfonic acid | red | 518 |
| 46) | 2-(anilino)ethyl 2-sulfatoethyl sulfone | 7-amino-1-hydroxynaphthalene-3,6-disulfonic acid | red | 524 |
| 47) | " | 7-amino-1-hydroxynaphthalene-3-sulfonic acid | red | 519 |
| 47) | 3-(anilino)propyl 2-sulfatoethyl sulfone | 7-amino-1-hydroxynaphthalene-3,6-disulfonic acid | red | 524 |
| 48) | " | 7-amino-1-hydroxynaphthalene-3-sulfonic acid | red | 518 |

EXAMPLE 49

32.3 parts of 3-(anilino)propyl 2-sulfatoethyl sulfone are dissolved in 200 parts of water at pH 5 by addition of 15% sodium carbonate solution and admixed with 4.6 parts of sodium fluoride. After cooling to 0° C., the solution is admixed with 13.5 parts of 2,4,6-trifluorotriazine. The pH initially decreases and then adjusts to 3.5–4.0. The reaction mixture is subsequently stirred for 15 minutes. 18.8 parts of 2,4-diaminobenzene-1,5-disulfonic acid are then added, the pH is adjusted to 5.5 with sodium carbonate solution and the solution is allowed to warm to 20–25° C. After stirring for 1 hour, 6.9 parts of sodium nitrite are added. The solution is then transferred over 30 minutes into an initial charge of 100 parts of ice and 50 parts of conc. hydrochloric acid (31%). The solution is subsequently stirred for 1 hour, and excess nitrite is then removed by addition of sulfamic acid.

23.9 parts of 7-amino-1-hydroxynaphthalene-3-sulfonic acid are dissolved in 300 parts of water at neutral pH and by addition of aqueous sodium hydroxide solution. After heating to 50° C., 13.4 parts of the sodium salt of formaldehyde bisulfite are added. The solution is subsequently stirred for 30 minutes, cooled to 20° C. and added dropwise into the cold diazo solution at 10° C. The resulting pH is 1.5–2. The pH is adjusted to 2–2.5 with sodium carbonate solution and the mixture is subsequently stirred at rising temperature for 3 h. The solution is adjusted to pH 6 with sodium carbonate solution, buffered with $NaH_2PO_4/Na_2HPO_4$ and evaporated. This affords a dye of the formula

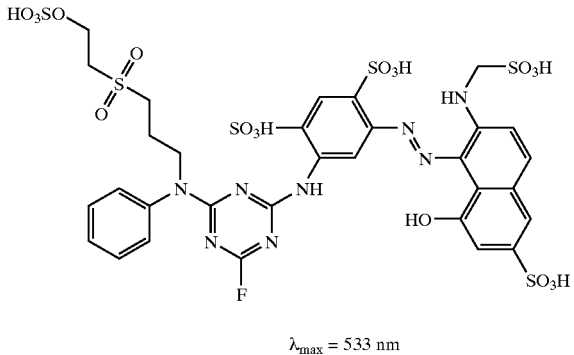

$\lambda_{max} = 533$ nm

The dye dyes cotton in a bluish red shade.

The dyes of examples 50) to 80), which are recited in the table which follows, and also the dyes of examples 42) to 48) are preparable in a similar manner by having a reactive amine starting material condensed with trifluorotriazine, condensed with the appropriate condensation component, diazotized and coupled onto the appropriate coupling component.

| Ex. | Reactive amine | Condensation component | Coupling component | Hue | λmax |
|---|---|---|---|---|---|
| 50) | 3-(anilino)propyl 2-sulfatoethyl sulfone | 2,4-diaminobenzene-1,5-disulfonic acid | 7-amino-1-hydroxy-naphthalene-3-sulfonic acid | red | 518 |
| 51) | " | " | 7-amino-1-hydroxy-naphthalene-3,6-disulfonic acid | red | 522 |
| 52) | " | " | 7-sulfomethylamino-1-hydroxynaphthalene-3-sulfonic acid | red | 535 |
| 53) | " | 1,4-diaminobenzene-2,5-disulfonic acid | 7-amino-1-hydroxy-naphthalene-3-sulfonic acid | red | 525 |
| 54) | " | " | 7-amino-1-hydroxy-naphthalene-3,6-disulfonic acid | red | 528 |
| 55) | " | 1,3-diaminobenezene-4-sulfonic acid | 7-amino-1-hydroxy-naphthalene-3-sulfonic acid | red | 510 |
| 56) | " | " | 7-amino-1-hydroxy-naphthalene-3,6-disulfonic acid | red | 514 |

-continued

| Ex. | Reactive amine | Condensation component | Coupling component | Hue | λmax |
|---|---|---|---|---|---|
| 57) | 2-(anilino)ethyl 2-sulfatoethyl sulfone | 2,4-diaminobenzene-1,5-disulfonic acid | 7-sulfomethylamino-1-hydroxynaphthalene-3-sulfonic acid | red | 532 |
| 58) | " | " | 7-amino-1-hydroxy-naphthalene-3-sulfonic acid | red | 519 |
| 59) | " | " | 7-amino-1-hydroxy-naphthalene-3,6-disulfonic acid | red | 523 |
| 60) | " | 1,4-diaminobenzene-2,5-disulfonic acid | 7-sulfomethylamino-1-hydroxynaphthalene-3-sulfonic acid | red | 536 |
| 61) | " | " | 7-amino-1-hydroxy-naphthalene-3-sulfonic acid | red | 525 |
| 62) | " | " | 7-amino-1-hydroxy-naphthalene-3,6-disulfonic acid | red | 528 |
| 63) | " | 1,3-diaminobenzene-4-sulfonic acid | 7-amino-1-hydroxy-naphthalene-3-sulfonic acid | red | 510 |
| 64) | " | " | 7-amino-1-hydroxy-naphthalene-3,6-disulfonic acid | red | 514 |
| 65) | 2-(4-sulfophenyl-amino)ethyl 2-sulfatoethyl sulfone | 2,4-diaminobenzene-1,5-disulfonic acid | 7-amino-1-hydroxy-naphthalene-3-sulfonic acid | red | 518 |
| 66) | " | " | 7-amino-1-hydroxy-naphthalene-3,6-disulfonic acid | red | 521 |
| 67) | " | " | 7-sulfomethylamino-1-hydroxynaphthalene-3-sulfonic acid | red | 532 |
| 68) | " | 1,4-diaminobenzene-2,5-disulfonic acid | 7-amino-1-hydroxy-naphthalene-3-sulfonic acid | red | 524 |
| 69) | " | " | 7-amino-1-hydroxy-naphthalene-3,6-disulfonic acid | red | 528 |
| 70) | " | " | 7-sulfomethylamino-1-hydroxynaphthalene-3-sulfonic acid | red | 536 |
| 71) | 2-(4-sulfophenyl-amino)ethyl 2-sulfatoethyl sulfone | 1,3-diaminobenzene-4-sulfonic acid | 7-amino-1-hydroxy-naphthalene-3-sulfonic acid | red | 510 |
| 72) | " | " | 7-amino-1-hydroxy-naphthalene-3,6-disulfonic acid | red | 515 |
| 73) | 3-(4-sulfophenyl-amino)propyl 2-sulfatoethyl sulfone | 1,4-diaminobenzene-2,5-disulfonic acid | 7-amino-1-hydroxy-naphthalene-3-sulfonic acid | red | 524 |
| 74) | " | " | 7-amino-1-hydroxy-naphthalene-3,6-disulfonic acid | red | 527 |
| 75) | " | " | 7-sulfomethylamino-1-hydroxynaphthalene-3-sulfonic acid | red | 536 |
| 76) | " | 2,4-diaminobenzene-1,5-disulfonic acid | 7-amino-1-hydroxy-naphthalene-3-sulfonic acid | red | 519 |
| 77) | " | " | 7-amino-1-hydroxy-naphthalene-3,6-disulfonic acid | red | 522 |
| 78) | " | " | 7-sulfomethylamino-1-hydroxynaphthalene-3-sulfonic acid | red | 531 |
| 79) | " | 1,3-diaminobenzene-4-sulfonic acid | 7-amino-1-hydroxy-naphthalene-3-sulfonic acid | red | 511 |
| 80) | " | " | 7-amino-1-hydroxy-naphthalene-3,6-disulfonic acid | red | 515 |

Example 81

28.1 parts of 4-(2'-sulfatoethylsulfonyl)aniline are dissolved in 250 parts of water by neutralization with 15% sodium carbonate solution. Parts of the dye of example 8) are introduced into the solution and the pH is adjusted to 5.5–6. After heating to 80° C., the pH is maintained in the adjusted range by adding sodium carbonate solution. The course of the reaction is monitored by thin layer chromatography. After the reaction has ended, the dye solution is cooled down, buffered and dried. This affords a powder whose structure conforms to the formula

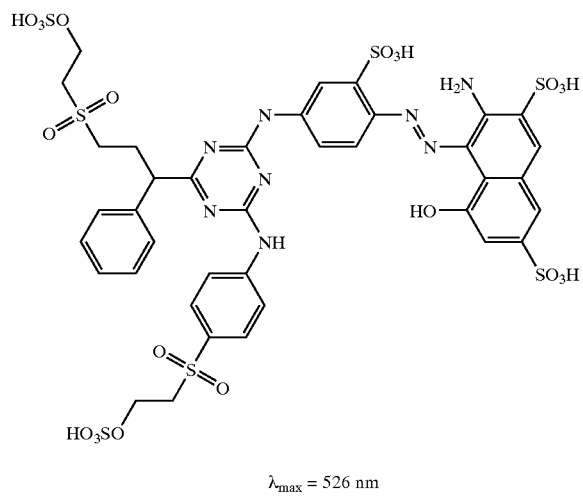

$\lambda_{max} = 526$ nm

It dyes cotton in a bluish red shade having good fastnesses, especially high lightfastness.

Examples 82) to 88) indicated in the table which follows are obtained in a similar manner by using the dyes of the indicated examples as a reactant and condensing them with a reactive amine.

| Ex. | Starting dye example | Reactive amine | Hue | λmax |
|---|---|---|---|---|
| 82) | 8) | 4-(2'-sulfatoethylsulfonyl)-N-ethylaniline | red | 527 |
| 83) | 3) | 3-(2'-sulfatoethylsulfonyl)aniline | red | 536 |
| 84) | 40) | 4-(2'-sulfatoethylsulfonyl)aniline | red | 516 |
| 85) | 26) | 3-(2'-sulfatoethylsulfonyl)aniline | red | 533 |
| 86) | 17) | 2-(anilino)ethyl 2-sulfatoethyl sulfone | red | 520 |
| 87) | 8) | 2-(anilino)propyl 2-sulfatoethyl sulfone | red | 528 |
| 88) | 26) | 4-(2'-sulfatoethylsulfonyl)aniline | red | 533 |

What is claimed is:

1. A reactive dye of the general formula (1)

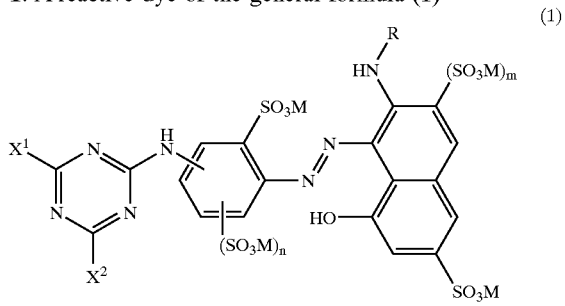

(1)

where

R is hydrogen, alkyl or substituted alkyl, $X^1$ is halogen, amino, optionally substituted amino or $X^2$, $X^2$ is a substituent of the general formula (2)

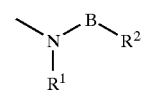

(2)

where $R^1$ is substituted or unsubstituted aryl,

B is alkylene which may be interrupted by an oxygen atom, and $R^2$ is a $-SO_2CH=CH_2$ or $-SO_2CH_2CH_2Z$ radical, where Z is a moiety which can be eliminated by the action of alkali, n and m are each 0 or 1, and M is hydrogen, ammonium, an alkali metal or the equivalent of an alkaline earth metal.

2. A reactive dye as claimed in claim 1, wherein n is 1.

3. A reactive dye as claimed in claim 1, conforming to one of the formulae (1a) to (1c):

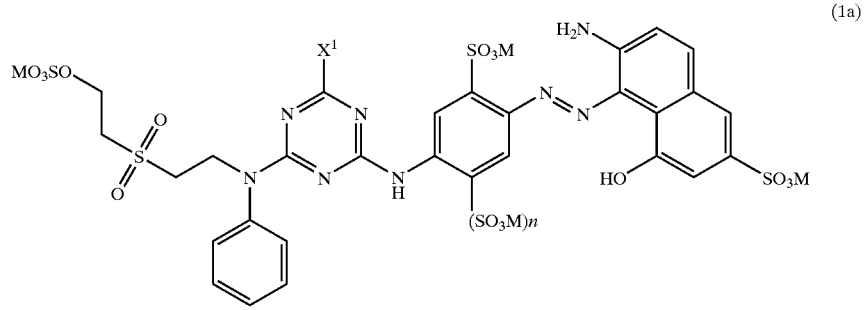

(1a)

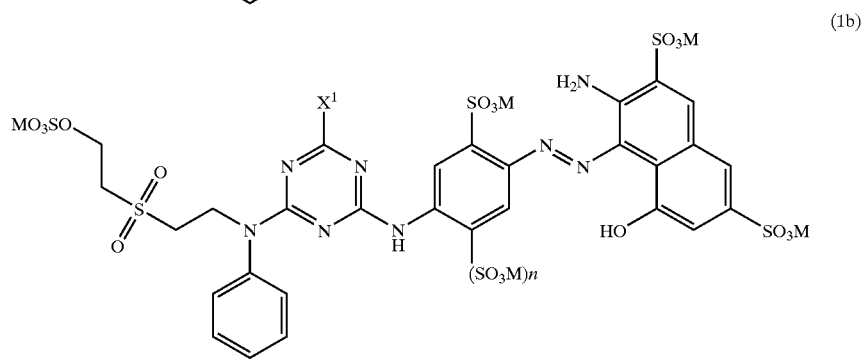

(1b)

-continued

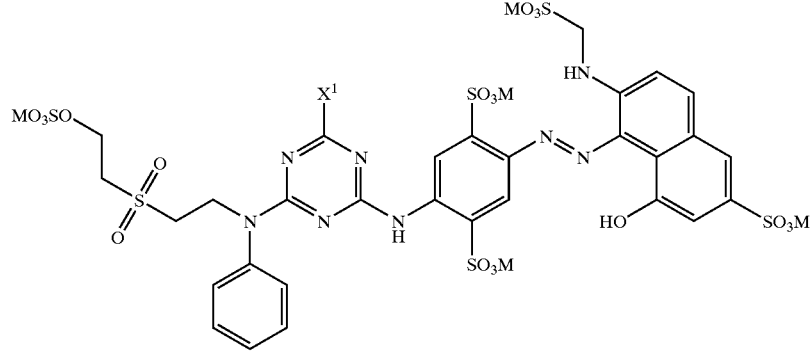

where M, n and $X^1$ are each as defined in claim 1.

4. A reactive dye as claimed in claim 1, wherein M is hydrogen or sodium.

5. A process for preparing a reactive dye as claimed in claim 1, which comprises diazotizing and reacting a reactive amine component of the general formula (3)

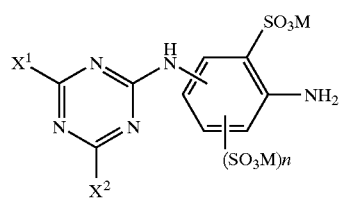

where $X^1$, $X^2$, M and n are each as defined in claim 1, with a compound of the formula (4)

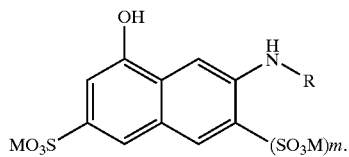

6. A process for preparing a reactive dye of the general formula (I) as claimed in claim 1, where $X^2$ is a radical of the general formula (2), which comprises reacting a compound of the general formula (5)

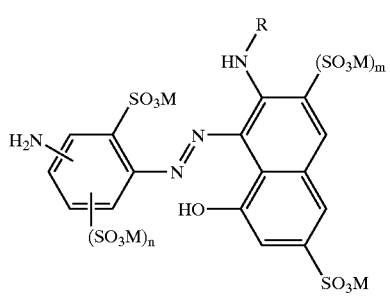

with a trihalotriazine and subsequent condensation with an amine of the general formula (2')

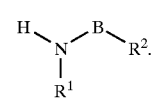

7. A process of dyeing or printing hydroxyl- and/or carboxamido-containing material which comprises contacting the dye as claimed in claim 1 with the material.

8. The process as claimed in claim 7, wherein the material is a fiber material.

* * * * *